No. 845,594. PATENTED FEB. 26, 1907.
J. S. STOUT.
SNOW PLOW.
APPLICATION FILED NOV. 23, 1906.

WITNESSES
H. G. Dieterich
J. Ack Acker

INVENTOR
John S. Stout
BY Munn & Co.
ATTORNEYS

THE NORRIS PETERS CO., WASHINGTON, D. C.

UNITED STATES PATENT OFFICE.

JOHN S. STOUT, OF OXFORD JUNCTION, IOWA.

SNOW-PLOW.

No. 845,594. Specification of Letters Patent. Patented Feb. 26, 1907.

Application filed November 23, 1906. Serial No. 344,736.

*To all whom it may concern:*

Be it known that I, JOHN S. STOUT, a citizen of the United States, and a resident of Oxford Junction, in the county of Jones and State of Iowa, have invented a new and Improved Snow-Plow, of which the following is a full, clear, and exact description.

The purpose of the invention is to provide a plow especially adapted for use upon railroads for removing snow and to construct the plow in multiple shovels arranged in a bank one above the other, each shovel being independent in its action, throwing the snow to the rear at each side of the structure.

A further purpose of the invention is to provide for the least resistance in operating the plow by stepping the shovels in their general arrangement, the lowermost shovel extending farthest to the rear.

Another purpose of the invention is to so construct the forward portion of the plow that it will cut the snow in blocks or sections before the shovels reach the snow, thus obviating any tendency to choke the plow in deep drifts.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1:
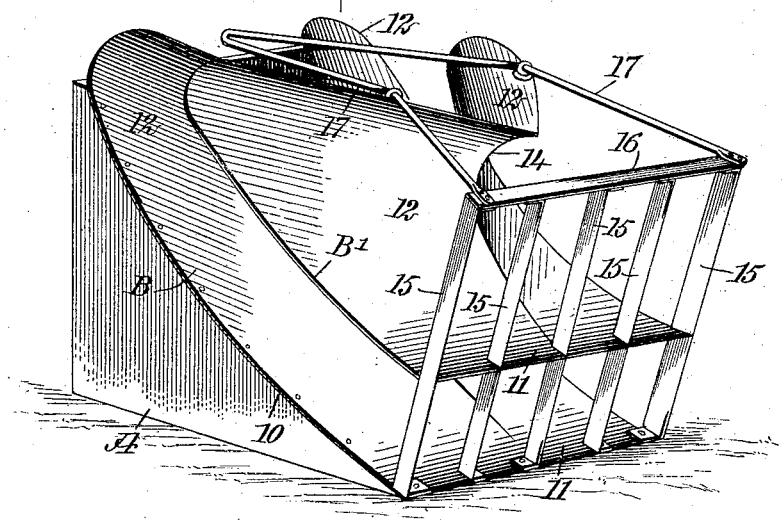
Figure 2:
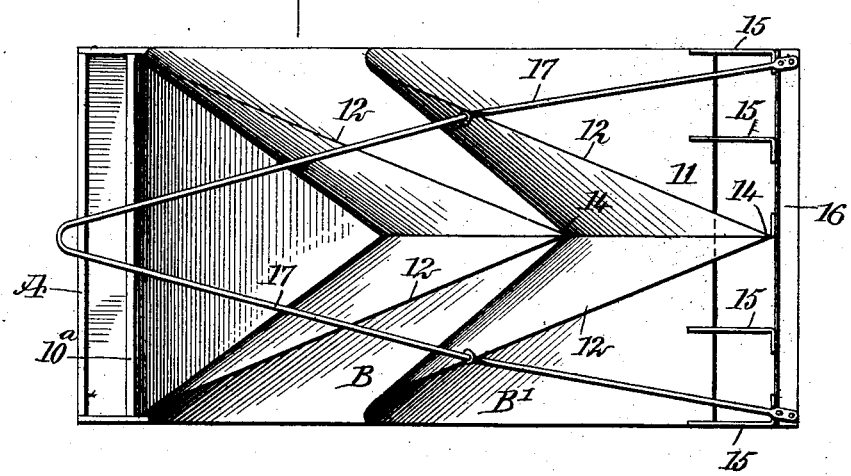

Figure 1 is a perspective view of the improved plow, and Fig. 2 is a plan view of the same.

A represents the body of the plow, which is adapted to be mounted upon a suitable truck, and said body is provided with a curved front surface 10, which extends downward from the back to the forward lower edge thereof, and a flooring 10$^a$ is secured upon the said concaved surface 10, as is illustrated in Fig. 2.

The body A of the plow is adapted to support a series of shovels, two shovels being designated in the drawings as B and B'. These shovels are arranged one above the other, and the shovels approximate the conventional types, but differ in essential details. The shovels are graduated in size, the lower shovel B being the longest, extending from the lower front edge of the body to a point at or near the point of its upper portion. The next shovel is stepped farther forward, not extending so far to the rear, while its forward or cutting edge overlies the corresponding edge of the shovel beneath it, and the same arrangement is preserved no matter how many shovels are employed in the construction of a plow.

Each shovel consists of a forward practically straight yet upwardly-inclined forward section 11, and the material of the shovels is bent upward and outward at each side to form moldboards 12, the said moldboards meeting at the central portion of the shovel at a point above the inclined plain or straight surfaces 11 of said shovels. The meeting of the moldboards at the front of the shovel provides for a dividing edge 14, and these dividing edges or sections for the shovels are given an upward and a forward inclination to any desired extent.

The upper portions of the dividing edges 14 of a lower shovel are secured in any suitable or approved manner to the upper shovel at the lower portion of the space between the moldboards, as is best shown in Fig. 2. These shovels horizontally cut through the mass of snow, and the mass received upon the plain forward sections 11 of the shovels is divided by the central division edges 14 of the said shovels and is directed to either one of the moldboards 12 of the shovels.

In order that the snow shall be sliced or cut in blocks before subjected to the action of the shovels, a series of vertical knives 15 is provided, located at predetermined distances apart, and said knives are passed through the forward or cutting edges of all of the shovels and are secured to the lowermost shovel at its cutting edge. The knives 15 are given a downward and a rearward inclination and are connected at their upper ends by a cross-bar 16, which bar may have a cutting edge, if so desired.

In order to strengthen the structure, braces 17 are secured to the end portions of the cross-bar 16 and in any approved manner to the upper edges of the moldboard-sections 12 of the uppermost shovel, although the said braces may be carried rearward and downward and be secured to the upper edges of the moldboard-sections of all of the shovels. The braces may be independent of each other, or they may be constructed in one piece, as is illustrated in the drawings.

A plow constructed as above set forth is exceedingly simple, durable, and effective, and in addition to throwing the snow to the sides of the track automatically cuts or slices the snow prior to its meeting the shovels, thus reducing friction to a minimum and also providing for rapid work and enabling the plow to be effectually employed in deep banks of snow.

Having thus described my invention, I claim as new and desire to secure by Letters Patent—

1. A snow-plow provided with a bank of shovels, the shovels being arranged one above the other, means for holding said shovels in position, a series of vertical spaced cutting-knives at the front of the shovels and extending the full depth of the bank, and a bar connecting the top of the knives.

2. In a snow-plow, a bank of shovels arranged one above the other, the shovels being graduated in size, the lowermost shovel extending farthest to the rear and the forward edges of the shovels being made to overlie each other from the top downward, a series of vertical spaced cutting-knives at the front of the shovels and extending the full depth of the bank, a bar connecting the tops of the knives and braces connected with the bar.

3. A snow-plow consisting of a body, shovels arranged one above the other, said shovels being graduated in length, the lowermost shovel being the longest one and extending farthest to the rear, the forward cutting edges of the shovels overlying one another from the top downward, each shovel comprising a forward inclined plain section, opposing moldboards and a central wedge-shaped division-section extending upwardly and forwardly from the central portion of the plain section, said cutting edges of the shovels being formed by the union of the moldboards at the front of said shovels, means for securing the shovels in position, and a cutting-frame stationarily located at the front of the plow, inclined from the top downward and rearward, which frame consists of a series of vertical knives that pass through the forward cutting edges of the shovels, and a connecting medium for the upper portion of said knives.

In testimony whereof I have signed my name to this specification in the presence of two subscribing witnesses.

JOHN S. STOUT.

Witnesses:
   F. H. SHIMANEK,
   MARY SHIMANEK.